[11] 3,631,601

| [72] | Inventor | Lloyd J. McNulty<br>Route 4, Cedar Heights, Hastings, Minn. 55033 |
|---|---|---|
| [21] | Appl. No. | 872,245 |
| [22] | Filed | Oct. 29, 1969 |
| [45] | Patented | Jan. 4, 1972 |

[54] METHOD AND APPARATUS FOR LAYING PIPE
5 Claims, 4 Drawing Figs.

[52] U.S. Cl. .................................................. 33/46 AT,
248/163, 248/187, 356/153
[51] Int. Cl. ............................................................ G11b 11/27
[50] Field of Search .................................................. 356/133,
154; 33/46 AT, 1 H

[56] References Cited
UNITED STATES PATENTS

| 1,662,836 | 3/1928 | Steinle............................ | 33/46 AT |
| 1,667,995 | 5/1928 | Steinle............................ | 33/46 AT |
| 2,303,530 | 12/1942 | Eisele............................. | 33/147 K |
| 2,405,441 | 8/1946 | Martin............................ | 356/154 |
| 3,116,557 | 1/1964 | Trice.............................. | 33/46 |
| 3,279,070 | 10/1968 | Blount........................... | 33/46 AT |
| 3,519,363 | 8/1970 | Ritcher.......................... | 33/46 X |

*Primary Examiner*—Leonard Forman
*Assistant Examiner*—Dennis A. Dearing
*Attorney*—Williamson, Palmatier & Bains

ABSTRACT: A laser beam projector is used to set a series of pipe sections in place along a predetermined line and grade by mounting the projector inside of a first pipe section preset on the desired line and grade by conventional surveying techniques, and then utilizing adjusting screws on the mounting housing supporting the laser projector in the first pipe section to precisely center the laser beam on a remote target positioned on the proper line and grade. With the laser beam thus projecting down the desired pipeline at the proper grade angle, successive pipe sections are set in place by placing the target within each successive pipe section and moving each pipe section laterally or vertically as required to center the target on the laser beam.

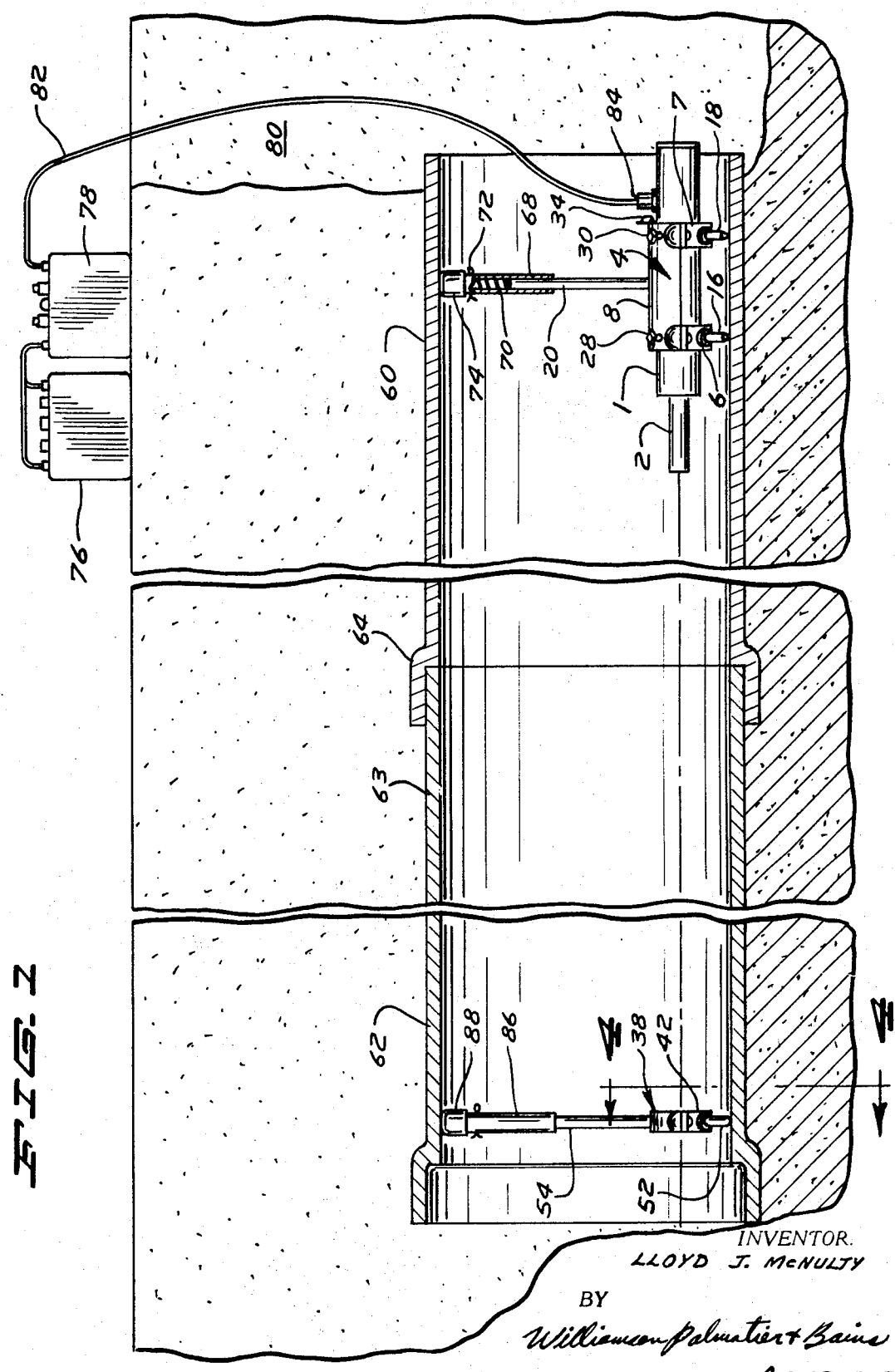

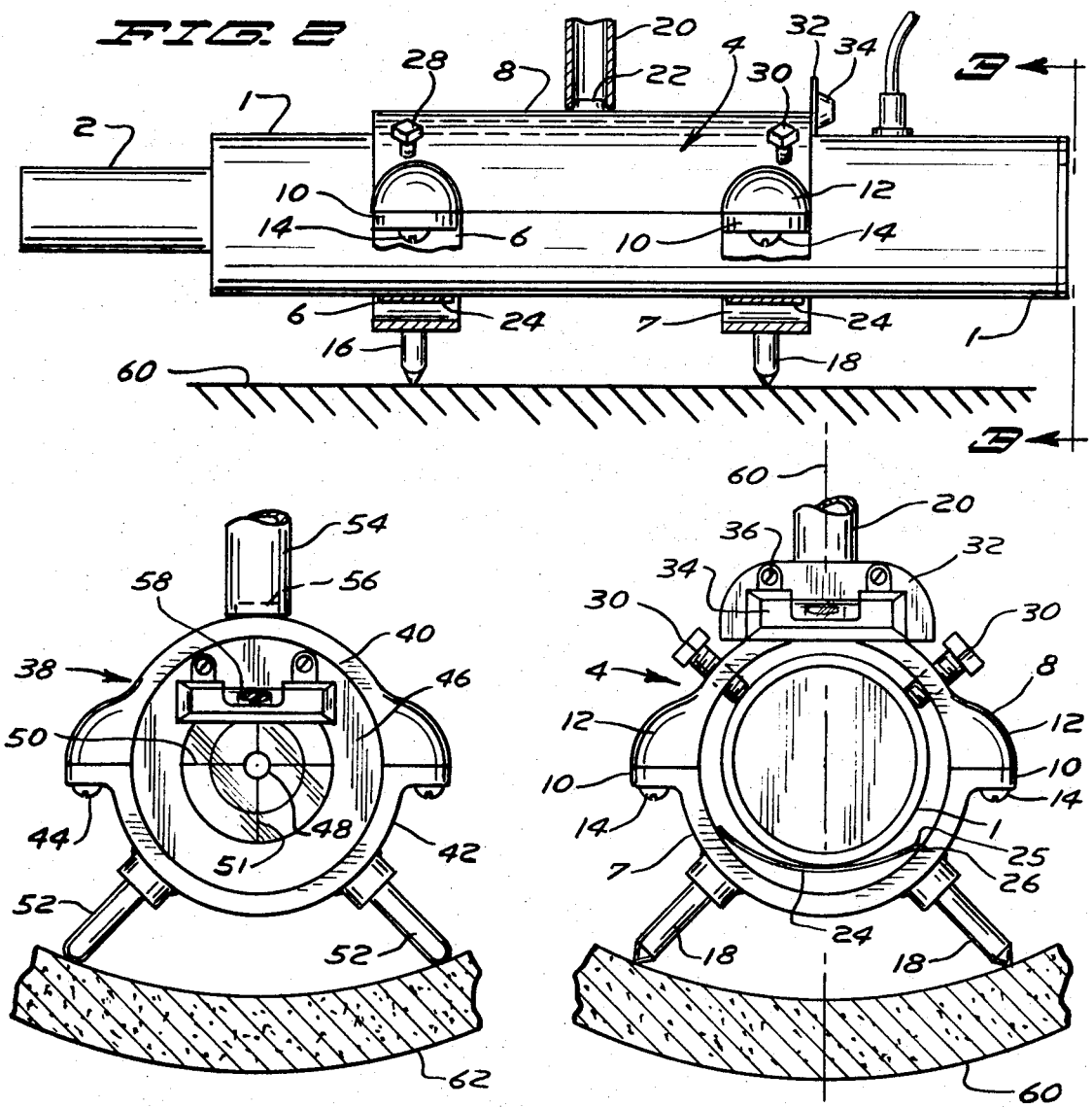

METHOD AND APPARATUS FOR LAYING PIPE

BACKGROUND OF THE INVENTION

Until very recently, pipelines were always installed by the tedious and time consuming conventional technique well known in the art wherein the line that the pipes are to follow is marked by a series of batter boards (small stakes) set on line by means of a transit and spaced apart at intervals such as 25 feet. Parallel strings running along the batter boards parallel to the pipeline and secured to the batter boards at a predetermined elevation a known distance above the grade level for the pipeline at each set of batter boards, or other marking means on the batter boards, are used to obtain a line of sight across the pipeline excavation on a level pole or rod in the excavation to set each pipe section at the desired grade. A plumb bob suspended downwardly into the excavation from a gauge pole and marking the axis of the pipeline is used to center each pipe section on line by adjusting the pipe sections laterally so that they are centered under the plumb bob. This process must be repeated for each pipe section as it is lowered into place and obviously provides much opportunity for error because of the grade slighting and plumb bob operations required. Also, a team of workers is required for this type of operation, and they unavoidably because tired and careless from time to time with the result that accurate work is not achieved. The result is pipelines that are layed out of grade, sections that do not seal properly, broken joints, etc.

Attempts have been made to improve upon this process in recent years by using a light projector such as a laser beam projector in place of the batter board, string and gauge pole devices to provide a visible, light beam indicia of the desired pipeline axis. Although the laser beam projecting apparatus has improved the accuracy and lessens the time in laying pipelines, the projector apparatus, and particularly the accessory equipment such as a special transit and level platform for supporting and adjusting the laser projector within an excavation on the desired line and grade is extremely expensive and difficult to set up quickly. Thus, there is a real need for a relatively inexpensive laser beam projector and mounting apparatus therefor which may be set up quickly and easily with a minimum of technical skill and training to provide a laser beam guideline for laying pipe.

BRIEF SUMMARY OF THE INVENTION

Having in mind the foregoing difficulties and disadvantages associated with present techniques for installing pipelines, I have developed a unique laser projector apparatus and method for using same particularly distinguished by simplicity of structure and installation and ease of operation.

These basic objectives are realized by utilizing a compact mounting structure for the laser beam projector which is constructed and arranged to permit the projector to be conveniently mounted within a section of pipe comprising a portion of a pipeline being layed. One of the pipe sections, preferably the first pipe section of a pipeline, thus advantageously and conveniently serves as a mounting platform for the laser beam projector. In the preferred embodiment of my invention, the mounting structure is in the form of a cylindrical housing and cradle means which encloses and supports the projector and which is provided with support members which engage opposed, interior wall portions of the pipe section to securely hold the projector in place.

As a particularly advantageous feature of my invention, an upwardly extending support on the projector mounting housing is provided with a vertically adjustable, spring-loaded section which may be pushed downwardly to permit the projector and mounting apparatus to be inserted within pipe sections having different diameters and which is urged upwardly by the spring against the top wall of the pipe section to assist in firmly holding the laser projector in place.

A further advantageous feature of my laser projecting apparatus resides in the provision of opposed adjusting screws in the aforesaid housing for the laser projector which engage the laser tube and may be utilized to precisely adjust the laser beam on line and grade to compensate for irregularities in the contour of the pipe section within which the projector is mounted.

A particularly important element in my laser beam system for installing pipelines is a laser beam target which may be removably mounted within pipe sections of varying diameters, and which is employed within the remote end of successive pipe sections to position them on line and grade as indicated by the laser beam.

In utilizing the aforesaid apparatus to install a pipeline, the laser projector is first installed within a first pipe section which has been previously set on the desired line and grade in the pipeline excavation by the aforesaid, conventional surveying techniques. The projector is carefully adjusted within the pipe section by means of the aforesaid adjusting screws so that the laser beam will project on line at the desired grade angle. Additional pipe sections are then installed one after the other to form the pipeline utilizing the aforesaid target within the remote end of each successive pipe section and properly setting each pipe section in place on line and grade by shifting the pipe section until the target therein is centered on the laser beam.

These and other objects and advantages of my invention will become readily apparent as the following description is read in conjunction with the accompanying drawings wherein like reference numerals have been used to designate like elements throughout the several views.

BRIEF DESCRIPTION OF THE DRAWINGS

FIG. 1 is a vertical section view of an excavation showing the manner in which my laser beam projecting apparatus is utilized to install a plurality of pipe sections;

FIG. 2 is a side elevation view of the laser beam projector and associated mounting structure;

FIG. 3 is an end view of the apparatus of FIG. 2 taken along lines 3—3; and

FIG. 4 is a vertical section view of the target device taken along lines 4—4 of FIG. 1

DESCRIPTION OF THE PREFERRED EMBODIMENT

The laser beam projecting and sighting apparatus of this invention has been particularly developed with a view towards simplifying and expediting the procedure for laying pipeline in a trench below ground level. To this end, a unique mounting arrangement for a laser projector has been provided as shown in FIGS. 2 and 3. The laser projector itself is comprised of an outer, tubular housing 1 within which an elongated, laser tube 2 extends coaxially therewith. The laser projector itself is a conventional design available on the market and forms no part of this invention. In order to support the laser projector in such a way that it may be readily mounted within a length of pipe in a manner hereinafter described, I utilize a compact housing 4 comprised for a pair of lower, cradle sections 6 and 7 and an upper, elongated enclosure body 8 of substantially semicircular cross section. Cradle members 6 and 7 include laterally projecting flange ears 10 by means of which they are connected to complementary flange portions 12 of upper housing enclosure 8 using screws 14. Although two separate front and rear cradle members 6 and 7 have been shown, a single, continuous cradle member could be utilized to support the underside of the laser projector.

As support means for securely holding mounting structure 4 in place within a pipe section, I preferably utilize front and rear legs 16 and 18 depending downwardly from cradle members 6 and 7 in combination with an upwardly extending, elongated support member in the form of a tubular section 20. Tubular section 20 is removably mountable on upwardly projecting boss 22 on upper, housing enclosure 8 and is provided with a vertically shiftable, pipe wall engaging portion described below with respect to FIG. 1 Each pair of legs 16 and 18 angle outwardly and downwardly and are adapted to engage the bottom of a pipe section 60 in the manner shown in FIG. 3.

For the purpose of adjustably supporting outer, cylindrical housing 1 of the laser beam projector within mounting housing 4, a transversely extending metal strip in the form of a leaf spring 24 is inserted between opposed sidewall portions of cradle members 6 and 7. One end 25 of each leaf spring 24 is inserted within a receiving slot 26 formed in the sidewall of cradles 6 and 7, and the opposite end of each leaf spring simply bears against the opposing sidewall of each of the cradles. Outer housing 1 of the laser projector rests upon leaf springs 24 at front and rear cradles 6 and 7 in the manner shown in FIGS. 2 and 3. At the front and rear ends of upper housing enclosure 8, opposed pairs of thumbscrews 28 and 30 extend through housing enclosure 8 in threaded engagement therewith and bear against the outer periphery of laser projector housing 1. Each pair of thumbscrews 28 and 30 are located in opposing relation to each other on opposite sides of housing enclosure 8 as shown in FIG. 3 and are angularly displaced with respect to each other at such locations as to be able to impart both lateral and vertical movement to projector housing 1. Thumbscrews 28 and 30 are used to achieve a precise alignment of the laser beam on a desired line at a particular grade angle. It will be apparent that as screws 28 or 30 are turned inwardly leaf springs 24 will be flexed downwardly and will tend to urge projector housing 1 upwardly whereby it will be held firmly between screws 28, 30 and leaf springs 24.

Welded or otherwise secured to the rear end of metal housing enclosure 8 is a bracket plate 32 on which level vial 34 is secured by means of screws 36. Spirit level 34 is employed in a manner hereinafter described to insure that the laser projector and its mounting housing are level when installed on the curvilinear wall of a pipe section. Initially, before the laser beam projecting apparatus is put to use to lay a pipeline, the laser projector and mounting structure assembly comprised of upper housing portion 8 and cradles 6 and 7 is placed on a level surface and screws 14 which hold the leg supporting cradles to upper housing enclosure 8 are tightened or otherwise adjusted until the bubble of spiril level 34 is centered. This insures that front and rear legs 16 and 18 extended downwardly precisely the same distance from the underside of cradles 6 and 7. Screws 14 are kept as tight as possible and are not subsequently used for adjusting the instrument. Future adjustment of the laser projector is accomplished by means of screws 28 and 30 only.

Shown in FIG. 4 is a target device which is utilized in combination with the laser beam projector to set a plurality of pipe sections along the desired line and grade to form a pipeline. The target device is generally indicated by reference numeral 38 in FIG. 4 and is comprised of an upper, semicircular body portion 40 which is secured to a lower, leg-supporting cradle 42 by means of of screws 44. The target face 46 is translucent and includes a small, center circle 48 marked by vertical and horizontal crosslines 50 and 51. Target 38 is adapted to be removable inserted and supported within a pipe section by means of support elements comprising downwardly depending legs 52 which angle outwardly from each other and an upwardly extending support member 54 which is adapted to engage the top wall of a pipe section. Support member 54 is of tubular construction and is removable restrained in engagement with the top of target 38 by being placed over boss 56 which projects upwardly from upper housing portion 40.

Target 38 further includes a level vial 58 which is fastened to the face 46 thereof and is utilized to insure that target 38 is mounted in a level position within a curvilinear pipe section.

It is important to note that support cradle 42 for target 38 and cradles 6 and 7 for the laser projector housing 4 are of substantially identical configuration and have legs 52, 16 and 18 of such a length and orientation as to support the center of target 38 and the longitudinal axis of the laser projector tube 2 at the exact same height above the pipe section bottom walls on which these devices are mounted. By virtue of this arrangement, target 38 can be used in pipe sections located remotely from the laser projector to align the laser beam on the desired pipelines and to set successive pipe sections on line and grade, in a manner which will now be explained with respect to the operation of my laser projector apparatus.

In using my laser projector apparatus to install a pipeline, a trench is first excavated along the desired pipeline path and a first pipe section 60 is placed at the bottom of the excavation as shown in FIG. 1. Pipe 60 is properly set on the predetermined line and grade by conventional surveying techniques using two, spaced apart strings extending parallel to the excavation on batter boards for obtaining a line of sight on a level rod or grade pole held upright in the trench to set pipe 60; a plumb bob suspended at the desired centerline of the pipeline is used to center pipe section 60 on line. At this time, at least one additional pipe section 62 is preferably set in place with its base or rear end 63 coupled to forward, bell portion 64 of pipe 60 in the manner shown in FIG. 1. The same conventional surveying techniques are employed in positioning pipe section 62 in line with pipe 60 on the desired grade. The laser beam projecting apparatus comprised of projector 1, 2 and its mounting housing 4 is then installed inside of pipe section 60 at the rear or base end thereof substantially at the location shown in FIG. 1. Laser projecting tube 2 is then centered laterally within pipe section 60 by shifting the assembled laser projector and mounting structure 4, 6, 7 left or right as required until legs 16, 18 of cradles 6 and 7 engage the curvilinear bottom wall surface of pipe section 60 at such locations that the projecting apparatus is level as indicated by reference to level vial 34. With the projecting apparatus supported at a level position within pipe section 60, the center of laser tube 2, and the laser beam projected therefrom, will necessarily be laterally centered on vertical centerline 66 of pipe section 60 in the mounting arrangement shown in FIG. 3.

Next, support post 20 is placed over retaining boss 22 on the top of laser projector housing 8 in an upwardly extending position as shown in FIG. 1. Upwardly extending support member 20 includes a vertically shiftable, tubular section 68 telescopically movable up and down thereon. Tubular section 68 is normally urged in an upward direction by coil spring 70 contained therein, spring 70 bearing at its upper end against a cotter pin 72 extending transversely through tube 68 and abutting at its lower end against the top of support post 20. A rubber bumper 74 on the upper end of tubular section 68 engages the upper, wall portion of pipe section 60. The combined height of support post 20 and tubular section 68 is preselected so as to be at least slightly greater than the internal diameter of the largest diameter pipe section with which my laser beam apparatus might be used. Thus, tubular section 68 will have to be pushed downwardly against the pressure of spring 70 in order to be received on top of post 20 within pipe section 60. It will thus be seen that spring 70 will normally urge tubular section 68 upwardly in tight engagement with the top of pipe section 60 so that the entire laser projector assembly is securely held between the pipe section and bottom wall portions by post 20, tubular support section 68 and legs 16, 18. A particular length of post 20 and tubular section 68 will normally be suitable for a size range of pipe sections. Combinations of support post 20 and vertically shiftable tubular section 68 having different lengths will have to be furnished for pipe sections having substantially different internal diameters in order that the laser projecting apparatus may be firmly mounted therein.

It will thus be seen that a first pipe section 60 serves as a platform for the laser beam projecting apparatus, and that the projector is made level on the pipe platform by shifting it laterally and referring to level indicator 34 in the aforesaid manner. There is thus no need for a separate, level platform for supporting the laser beam projector outside of the pipe sections which are being installed to form a pipeline. For this reason, there is no need to fully construct a manhole adjacent the location of the first pipe section for the installation of a special, laser projector platform to support the laser projector on the longitudinal axis of the proposed pipeline. It is only necessary that manhole area 80 be sufficiently large to provide the necessary access to the interior of pipe section 60 for the mounting of the laser projector apparatus therein. Power is supplied to the laser beam projector from a DC battery 76 connected to a power converter 78 which converts the DC voltage to AC and steps down the voltage to the correct level required by the laser projector. A power cord 82 extends between converter 78 and a connecting fitting 84 on laser projector housing 1. Battery 76 and converter 78 may be located at the top of the excavation as shown, or at the bottom of the manhole area, or even within first pipe section 60 if desired.

A final, precise alignment of the laser beam projector and the laser beam emitted thereby on the predetermined line and grade of the pipeline is accomplished by means of adjusting screws 28 and 30. For this purpose, a target must be positioned at a remote location from the laser projector along the pipeline, properly positioned on line and grade, and the laser beam is projected at this target and centered thereon using adjusting screws 30. Although various types of targets may be utilized for this purpose, and positioned and supported within the pipeline excavation on line and grade by different means, I prefer to utilize target 38 for this purpose by installing it in the forward or most remote end of second pipe section 62 at the location shown in FIG. 1. Target 38 is centered laterally within pipe section 62 by shifting it left or right therein as required until it is level as indicated by reference to level vial 58 thereon. When legs 52 or target 38 engage the bottom, curvilinear wall of pipe section 62 at such locations that target 38 is level, vertical centerline 51, (FIG. 4) of target 38 will be coextensive with the vertical centerline of pipe section 62. Target 38 is securely held in place by means of spring-loaded, vertically shiftable tubular section 86 telescopically slidable on upright post 54 in the same manner as described above with respect to tubular section 68 of post 20 for the laser gun projecting apparatus. A rubber bumper 88 on the upper end of tubular section 86 firmly engages the top wall surface of pipe section 62; and target 38 is held firmly in place between the opposed upper and lower wall portions of pipe section 62 by upright support members 54, 86 and downwardly depending legs 52. As was pointed out above, legs 52 of target 38 support the target center at an elevation above the bottom interior wall surface of pipe section 62 which is precisely the same as the elevation at which the center of the laser beam is supported by legs 16, 18 above the interior, bottom wall surface of pipe section 60. Therefore, with target 38 supported within a remote pipe section 62 properly positioned on line and grade by conventional surveying techniques, with its center on the vertical centerline of the predetermined pipeline, the laser beam should strike the center of target 38. If it does not, because of irregularities in the internal, surface contour of pipe section 60 within which the beam projecting apparatus is mounted, all four thumbscrews 28, 30 are adjusted until the laser beam does strike the center of target 38. This adjustment compensates for any surface irregularities within pipe 60 which might cause the beam to deviate from the desired line and grade even through level vial 34 indicates that the laser projecting apparatus is properly centered and aligned within pipe section 60. With the laser beam projecting along a line parallel to the longitudinal axis of the proposed pipeline and centered on target 38, the beam will accurately indicate the predetermined line and grade angle of the pipeline.

Additional pipe sections are now set in place in end to end abutting relation in the manner shown for pipe sections 60 and 62 in order to complete the pipeline. Each additional pipe section is set in place on the predetermined line and grade of the pipeline by successively inserting target 38 within each pipe section and then using target 38 to properly align the pipe by reference to the laser beam. Target 38 is mounted within the successive pipe sections in the same manner as described above with respect to pipe section 62, and is centered therein by reference to its level vial 58. The pipe section being installed is then shifted laterally or moved upwardly or downwardly as required until the laser beam strikes the center of target 38. This process is repeated with each successive pipe section until the pipeline is completed.

The first several pipe sections 60, 62 which are installed by conventional surveying techniques should be carefully tamped and backfilled so that they will be securely held in place to avoid the shaking or jarring of the laser beam projector off of line and grade. It is advisable to recheck line and grade periodically by conventional surveying techniques, at 50-foot intervals for example, to be sure that the laser beam projector has not been jarred off of line.

Those skilled in the art will readily appreciate that my unique laser projecting apparatus, and its method of installation and use as described above, represents a distinct step forward in the art of pipelaying. No elaborate or expensive platforms or aligning devices are required for initially installing the laser beam projector on line and grade, since this is accomplished in a very simple manner by mounting the laser beam projector within a first pipe section set in place on line and grade by conventional surveying techniques. The laser beam projector can be installed in a few minutes by a crew member not having a high degree of engineering skill, and the number of men required for installing a pipeline is substantially reduced. The loss of time and inaccuracy normally resulting from sighting over batter board strings for grade and using a plumb bob for line are eliminated. My improved method and apparatus for installing a pipeline may obviously be used for laying any type of pipe, such as sewer pipe, or even drainage pipe in a shallow excavation.

I claim:

1. A method of laying a pipeline along a predetermined line and grade comprising the steps of:
   presetting a plurality of pipe sections end to end along a predetermined line and grade using a line-of-sight device and a level indicator;
   installing a light projector capable of projecting a collimated beam of light for an extended distance horizontally within one of said plurality of preset pipe sections, the longitudinal axis of said light projector being parallel to the longitudinal axis of said one pipe section;
   adjusting said light projector within said one pipe section so that the longitudinal axis of the projector, and thus of the beam projected therefrom, is centered laterally on the vertical centerline of said one pipe section;
   placing a target within the far end of another one of said plurality of pipe sections remotely located from said light projector along the desired pipeline;
   centering said target laterally within said remote pipe section so that the center of said target is on the vertical centerline of said remote pipe section;
   projecting a beam of light from said projector and precisely adjusting said projector as required so that said beam of light strikes the center of said target, the center of said target and the center of said light beam being set at the same, predetermined elevation above their respective pipe sections so that said laser beam will now be in line with the predetermined pipeline axis at the desired grade angle; and successively installing additional pipe sections along said predetermined line and grade by positioning said target within each successive pipe section after it has been coupled to the preceding pipe section and shifting each pipe section laterally or vertically as required until said collimated beam of light strikes the center of said target.

2. A method of installing a pipeline along a predetermined line and grade comprising:
   presetting a plurality of pipe sections end to end along a predetermined line and grade using a line-of-sight device and a level indicator;
   installing a laser beam projector within a first pipe section preset on said desired line and grade with the longitudinal axis of said projector parallel to the longitudinal axis of said pipe section;
   projecting a laser beam from said projector towards a remote target so positioned laterally and vertically with respect to said predetermined line and grade that said laser beam will extend along the desired pipeline at the proper grade angle when it is centered on said target;
   adjusting said laser beam projector within said first pipe section laterally or vertically as required to center said laser beam on said target, whereby said laser beam will serve as a visual indication of said predetermined line and grade; and connecting additional pipe sections end to end along the desired longitudinal axis of the pipeline by placing a target inside of each successive pipe section transversely thereof with the center of said target at a predetermined height above the inside, bottom wall of each pipe section which is the same as the height at which the longitudinal axis of said laser beam is located above the inside, bottom wall of said first pipe section, and adjusting each successive pipe section as required until said laser beam strikes the center of said target.

3. A method of installing pipeline as defined in claim 2 wherein:

said centering of said laser beam projector within said first pipe section is accomplished by shifting said projector therein on mounting means engaging the inside, curvilinear walls of said first pipe section until said projector is level as indicated by reference to a level vial thereon.

4. A method of installing a pipeline as defined in claim 2, and further including:

centering said laser beam projector within said first pipe section by shifting it on support means engaging the interior wall surface of said first pipe section until said laser beam projector is centered on the vertical center line of said first pipe section.

5. Apparatus for laying a pipeline along a predetermined line and grade comprising:

a light projector capable of emitting a collimated beam of light;

mounting means in the form of a cradle structure on which said light projector is securely mounted, said cradle structure being of such a size and shape as to be completely receivable within a section of pipe set in place along said predetermined line and grade;

support means for said cradle structure constructed and arranged to engage opposed, interior wall portions of said section of pipe to firmly hold said cradle structure and light projector therein, said support means comprising downwardly depending leg means permanently attached to said cradle structure and adapted to engage the bottom of said pipe section and an upwardly extending, elongated support member adapted to engage the top, interior wall of said pipe section, said upwardly extending support member having at least a portion thereof shiftable in a vertical direction to permit said support means to be tightly held between upper and lower wall portions of pipe sections of varying diameters;

a target having support elements thereon for mounting said target transversely within a pipe section remotely located along the desired pipeline from said pipe section within which said light projector is mounted, whereby such remote pipe sections might be set in place on the desired pipeline by being shifted to center said target therein on beam from said light projector, said support elements for said target comprising downwardly depending leg means permanently secured to said target and adapted to engage the bottom of a pipe section and an upwardly extending support member adapted to engage the top of a pipe section, said upwardly extending support member including a vertically shiftable section to permit the secure mounting of said target in pipe sections of varying diameters; and said leg means for said cradle structure and said target being of a predetermined height and so constructed as to support the center of said target and the longitudinal axis of the light beam emitted by said projector at exactly the same, predetermined elevation above the inside bottom walls of the pipe sections in which said projector and target are installed.

* * * * *